June 17, 1958  H. SICKEL  2,838,893
METHOD AND DEVICE FOR PROCESSING AMPULS AND THE LIKE
Filed March 1, 1952  4 Sheets-Sheet 1
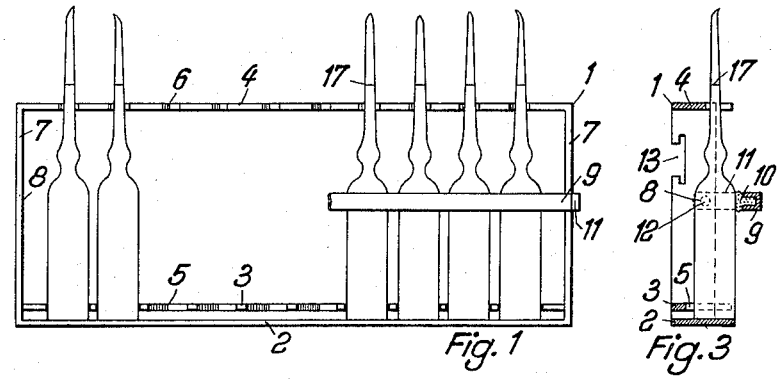
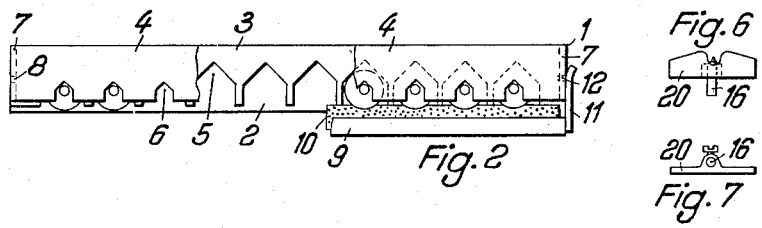
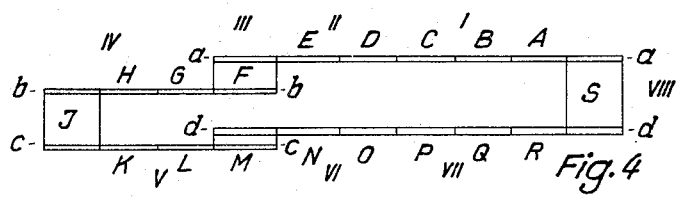
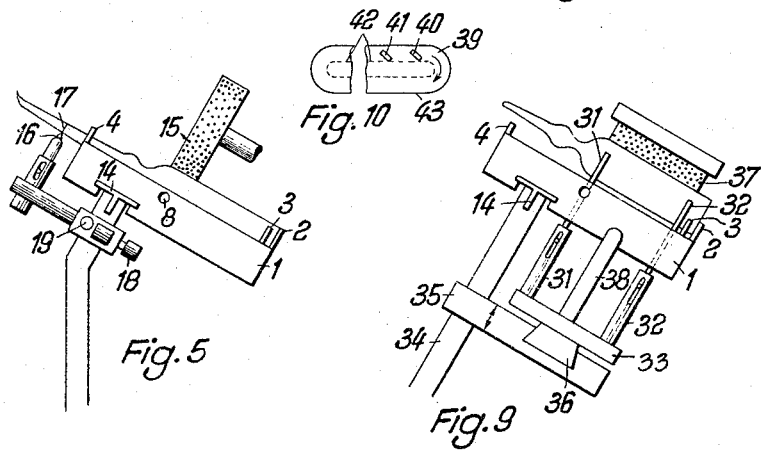
Inventor:
Hermut Sickel
by Michael S. Striker
Agent

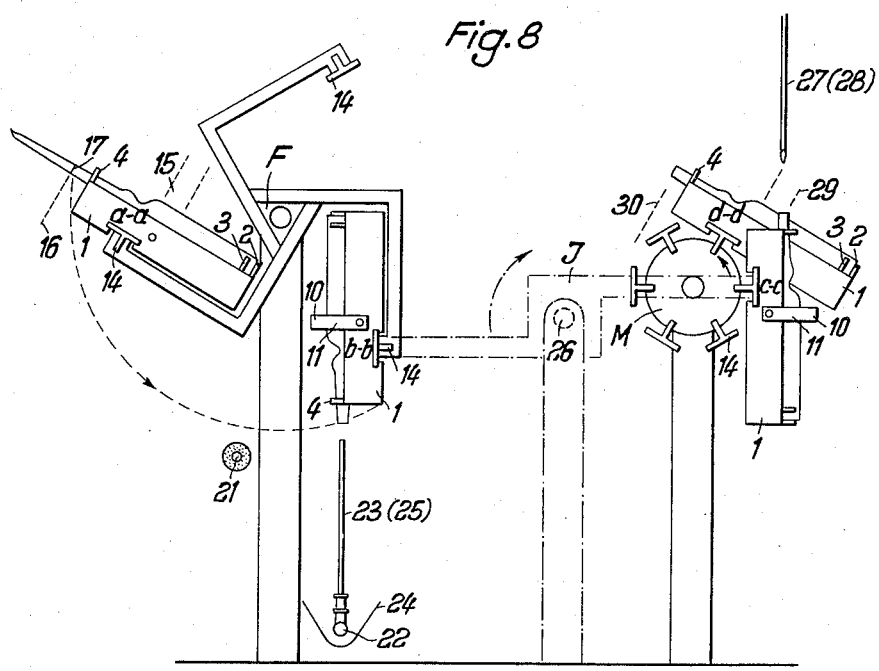
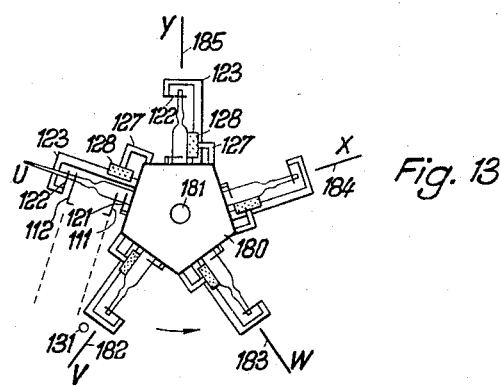

June 17, 1958 H. SICKEL 2,838,893
METHOD AND DEVICE FOR PROCESSING AMPULS AND THE LIKE
Filed March 1, 1952 4 Sheets-Sheet 4
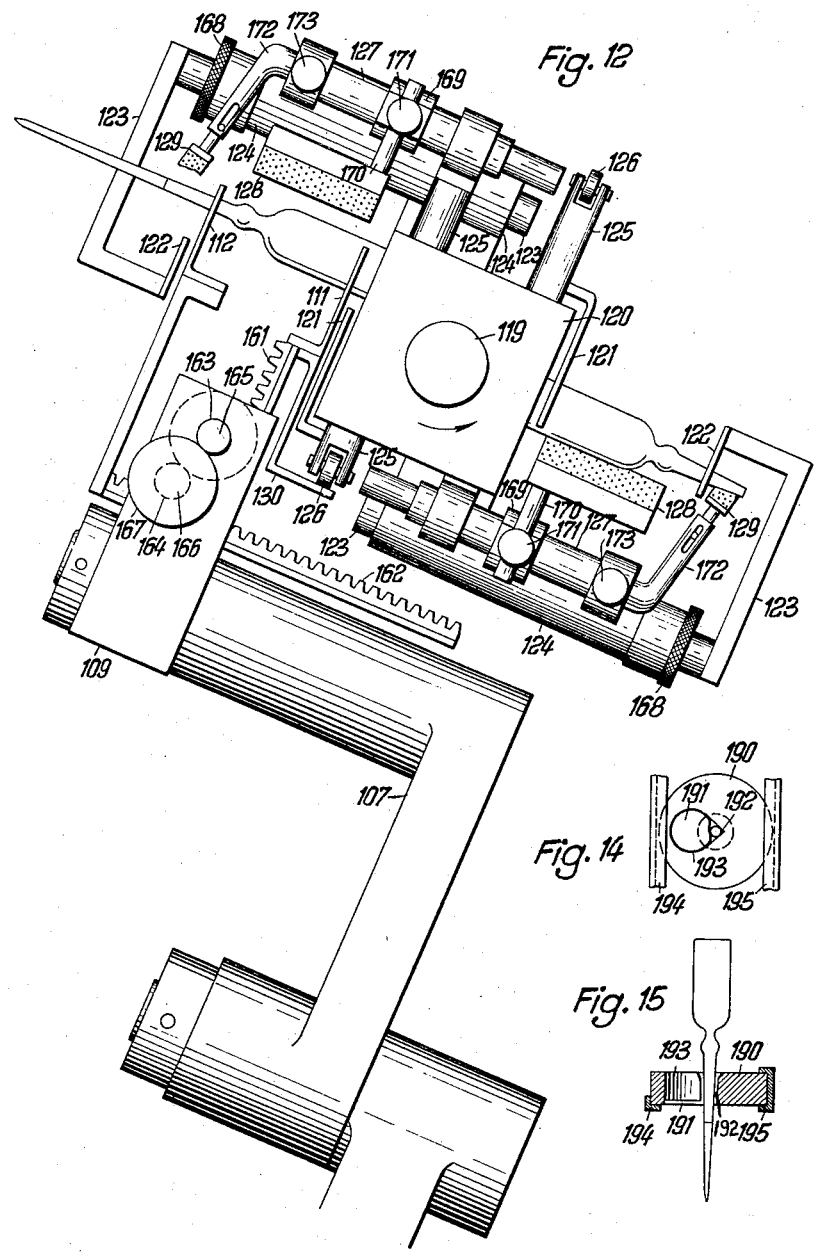
Inventor:
Helmut Sickel
by Michael S. Striker
Agent

United States Patent Office 2,838,893
Patented June 17, 1958

2,838,893

METHOD AND DEVICE FOR PROCESSING AMPULS AND THE LIKE

Helmut Sickel, Hamburg, Germany

Application March 1, 1952, Serial No. 274,464

Claims priority, application Germany March 5, 1951

35 Claims. (Cl. 53—37)

This invention relates to a method and a device for the treatment of ampuls and other containers of glass or other material having a narrow spear, for the purpose of filling and sealing the ampuls in combination with other necessary processings.

The term "spear," as used in this specification, designates the gradually upwardly tapering portion of the ampul, extending from the bulged portion above the neck to a point at its upper extremity, while "neck" represents the contracted portion immediately above the body portion of the ampul.

A primary object of the invention is to prevent the considerable spoilage of ampuls being not tightly sealed or containing splinters, and the therewith connected losses of glass and fillings, drawbacks being due partly to deviating ampul spears, partly to the methods of processing ampuls hitherto employed, and to provide a novel and simple method for processing ampuls and the like, assuring that at least all treatments to be effected at and through the ampul spear, such as, for example, cutting, inside-cleaning, filing, sealing, are effected, even on ampuls with deviating spears, in accurate operative relation to the respective treating means and under strict equality of operation conditions, being the indispensable prerequirements for good and uniform results.

Another object of the invention is to provide that all ampuls are uniformly cut to uniform height so that, later on in processing, the sealing flame impinges exactly upon the openings of all ampul spears.

A further object of the invention is to prevent damage to the sensitive cut-off points of the ampul spears before they are sealed.

Still another object of the invention is to avoid that the ampuls must be handled or stored between single treatments, and to provide a novel method and simple means rendering it possible to join all treatments, at least such on open ampuls, and in operative positions convenient to the respective treatments, to a continuous, correlated cycle of operation, thus preventing damage to the sensitive ends of the ampul spears and the entering of glass splinters or dust into the ampuls, especially after their inside-cleaning.

In carrying forward the objectives of this invention it is proposed to support the ampuls, during all treatments at and through their spears, at spaced points along the length of the ampul, whereby the upper of said spaced supporting points is situated at the spear below the point of prospective sealing, so that said ampul spears are kept always uniformly oriented in adjusted position, warranting their immediate and accurate operative relation to all treating means to be confronted by said ampuls. The lower of said spaced supporting points may be situated near the bottom of the main body of the ampul, or at any point below the mentioned upper supporting point, for instance, likewise at the spear. In the latter case, for supporting the ampule it suffices to clamp merely the ampul spear at an extent between the last mentioned two spaced supporting points.

A further object of the invention is to provide a method and simple means for processing groups of ampuls at a time in the proposed manner.

Still a further object of the invention is to provide suitable methods and means for supporting ampuls or ampul groups, which, for certain treatments, such as, for example, incising or sealing the spears, allow ampul rotation while maintaining said uniform spear orientation in adjusted position.

Another object of the invention is to provide suitable methods and means for conveying ampuls or ampul groups on or with their adjusting supports to the various treating means.

A further object of the invention is to provide reliable methods and simple means for inside cleaning and drying of the ampuls immediately before they are filled, without interrupting the continuous, correlated cycle of operation.

Still a further object of the invention is to provide suitable methods and means for transferring the ampuls or ampul groups by means of their adjusting supports into operative positions convenient to the respective treatments.

Still a further object of the invention is to provide for ampul supporting and conveying means leaving good accessibility to said adjusted ampuls or ampul groups for operations such as, for example, marking or labelling, burning-in the markings by heat, and for optical tests.

Still a further object of the invention is to render available a machine capable of effecting all treatments, required in a special case and in operative positions convenient to the respective treatments, on said uniformly supported and adjusted ampuls or ampul groups in a continuous, correlated cycle of operation.

Still a further object of the invention is to render available a semi-automatic setup of simple construction and capable of effecting, by aid of few attendants, the same cycle of treatments with equal accuracy and with substantially the same output.

For keeping the ampul spears uniformly oriented in adjusted position, the invention provides various ways for supporting the ampuls at the above mentioned spaced supporting points along their length.

Thus, the supporting may consist of a more or less close surrounding of the ampul, at said supporting points, by a retainer, such as a clamp, or merely of a loose arrangement of the ampul on a suitable bedding.

The uniform adjustment of the ampul spears during all treatments throughout the whole cycle of operations, being a characteristic of the present invention, can also be achieved in that the ampuls, during their passing from station to station and during the several treatments, remain in the same retainer or clamp, or, in that they are conveyed during their passing from the initial bedding to a similar adjusting bedding at subsequent treating stations.

In the latter case, the ampuls require an adjusting support for their spears during their conveying only when, during that conveying movement, a treatment at their spears is to be effected. Otherwise there suffices during such conveying movement a support for the ampuls, which only assures that the spears are put in their adjusting supports again on arrival at the next treating station. When treatments, such as marking or labelling or the like, are to be effected on the ampul bodies, a support for the spears may similarly be dispensed with. It may in such cases be even advantageous to give the ampul bodies as temporary adjustment to the named treatments an especially suitable support, as, for instance, resiliently supported rollers, and the like.

If for certain treatments rotation of the ampuls about their axis is necessary, this also can be done whilst maintaining the uniform adjustment of their spears. In using the mentioned clamping manner, every ampul is clamped with its spear coaxially in a rotary carrier. In such carriers the ampuls are, after aligning to equal heighth, successively passed from station to station and into necessary operative position, and, if the treatment requires it, are rotated with their carriers about their axes in accurate operative relation to the respective treating means.

In using the more loose adjusting manner by laying the ampuls on a suitable support and adjusting their spears by a loose bedding, provision is made that the ampuls are secured against lateral and longitudinal displacement but are allowed to rotate about their longitudinal axes, thereby maintaining their spear adjustment. When transferring the ampuls into another position, the adjustment of their spears is maintained by clamping the ampuls in position.

Such a support for receiving ampuls, preferably in recumbent position, may consist, for example, of three bars or rails arranged in parallel, two of which have notches, one rail with notches to receive the ampul spears closely beneath the point of prospective sealing and adjusting them uniformly, the other rail, to receive the ampul bodies closely to their bottoms, and the third rail without notches serving as rest for the ampul bottoms. Lying on these rails, the ampuls are practically accessible from all sides.

Upon such supporting means, consisting, for example, of three bars as described and connected by end members to framelike ampul carriers, the ampuls are passed on a suitable track from station to station, and, while secured to the carrier frame by a clamp, may be turned over into any operative position convenient to the respective treating means.

In another kind of such supporting means, the ampuls lie, for example, on three rails as described, forming, in this case, a stationary ampul supporting rail track, and are conveyed stepwise from treating station to treating station by means, for example, of a conveying mechanism in such a manner that the ampuls are taken from the notches in the rails at one station and are conveyed into similar notches in the rails at the next station; all notches rendering the same accurate adjustment to the ampul spears.

The path which the ampuls follow during their travel from station to station, while maintaining adjustment of their spears as provided by this invention, can be circular or may have any other suitable configuration. The transferring of the ampuls into any needed operative position at any station can be effected during stoppage of the ampuls at a station or previously thereto during the forwarding motion, for example, along a curved track.

This invention affords also very simple means for simultaneous treatment of groups or lots of ampuls in a continuous correlated cycle of operation, whereby accurate adjustment of the spear of each ampul in every group is also maintained. The path of travel of the groups of ampuls can in group treatment also have any suitable form, but it is advantageous to convey the ampul groups, with the spear of each ampul uniformly adjusted as aforesaid, in succession and in the direction of their groupwise arrangement, along one or more straight tracks to the various treating stations, whereas, for transfer into another operative position as well as onto another conveying track, they are moved in crosswise direction to said conveying track.

If the sequence of treatments lends itself to a sequence of operative positions which can conveniently be arranged around a circular path with a horizontal axis, the ampuls held in their supports can be guided to follow along such a circular path with the result that, during their travel, they attain all angles of inclination, some of which may be advantageous or even necessary for certain treatments, such as, for instance, upright position for filling or upside down position for cleaning.

For such circular motion about a horizontal axis in connection with a method, otherwise carried out along a straight track with groupwise treatment, it is possible to interpose in the conveying track a rotary body turning stepwise about a horizontal axis and having carrier or guide rail sections on its side faces, of which rail sections one at a time forms a part of the continuous track and serves for conveying ampuls to or from the rotary body. The other rail sections, being in other positions at the same instant, present ampuls with their adjusted spears in accurate operative relation to the treating means at those stations.

Owing to the fact that the ampuls retain the uniform adjustment of their spears according to this invention, as they travel to the several treating stations and into any needed operative position in such adjustment, they can be readily brought into accurate operative relation to all treating means which must be applied in a certain cycle of operations, so that all treatments can be effected in a continuous correlated processing; and this is done, according to the peculiarity of a certain treatment, either during travel or during stoppage of the ampuls. In this manner it is, for instance, possible to perform on the ampuls, while uniformly adjusted at their spears as provided by this invention, singly or in groups and in a continuous cycle of operations, a number of treatments which, for instance, can comprise: incising the spears, breaking-off the spear tips, cleaning and drying from the inside, in case of necessity combined with sterilizing, prefilling with an inert gas, filling, sealing, labelling or marking, burning-in the marking (marking and burning-in may be effected before filling in case the filling is heat-sensitive), sterilizing, testing for tight closure and for splinter contamination, and perhaps cleaning from the outside and packing.

Which of the above-mentioned treatments and in which order they have to be applied, or whether other additional treatments, such as for instance, setting up strain in the neck of the ampul to facilitate opening before use, treatments by rays or waves (which, owing to the free accessibility to the ampuls from all sides as provided by the carrying method of this invention, can be readily performed), closing of ampuls consisting of plastic material by plastics or other thermosetting materials or by pressure, may become necessary, depends entirely on prevailing circumstances and on the results desired; it depends especially on the kind of ampuls or kindred containers and on the material they are made from; it depends furthermore on the nature of the filling and its purpose, and the requirements of its medical or industrial application.

In accordance with the treatments and the cycle of operations found to be necessary, the best manner as provided by this invention can be selected.

All factors combined represent the basis for a most favourable arrangement of technical means, according to this invention, for a problem at hand; whereby it is also possible to associate the treating means and set-up of this invention with an ampul manufacturing machine.

One of the primary advantages of the method of this invention is the fact that the ampul spears are cut uniformly and at equal height and that these sensitive cut-off points remain undamaged too, which is an indispensable prerequirement for perfect sealing.

The invention meets furthermore all prerequirements for obtaining ampuls with their contents free from dissolvable or indissoluble contaminations and of glass splinters. The only method for a perfect inside cleaning of ampuls, which is vigorous injection of cleaning fluid or steam through inlet tubes inserted from below through the spears into the ampuls, can be carried out economically and without additional work in correlated operation with the filling and other treatments, and, owing to the uniform adjustment of the ampul spears according to this invention, in such a manner that, during inserting and retracting the cleaning tubes, during cleaning treatment, on the way from the cleaning to the filling station, during inserting and retracting the filling tubes and on the way from the filling station to the sealing station, damages to the sensitive cut-off points of the spears are prevented, which otherwise would be the cause of new contamination as well as of sealing troubles.

As shown by way of example in the following detailed description, this invention makes it even possible to effect all treatments of the ampuls, while adhering to the features of adjustment of the ampul spears with all its advantages as provided by this invention, in large quantity processing of groups of ampuls in a semi-automatic manner with relatively few attendants whose duty it is to forward the ampul carriers with ampuls along the track connecting the several stations and to actuate the treating means each one at his station.

The possibility of processing ampuls in large quantities semi-automatically by several treatments requiring extreme accuracy in a continuous cycle of operations offers two other considerable advantages. One of these advantages is that little equipment is required. Such equipment is substantially limited to conveying tracks for ampul groups and simple, mostly lever-actuated treating devices at the various treating stations. Not needed are mechanisms for conveying drives and for the correlated actuation of the various treating devices. The other advantage of large-quantity processing by the present method is that single treatments to which the ampuls are subjected can be effected under observation and control, and can be governed correspondingly. It is very valuable to be able to detect and remedy difficulties in incising and sealing. These troubles may arise from such reasons as inferior ampuls with slanting spears, with varying spear diameter, with oval spear cross-section, with varying wall thickness, with varying melting points of the glass, etc. Such difficulties, if detected, can in most cases be obviated by adjusting duration and grade of treatment; and detection and instant remedy is possible only in semi-automatic operation, which does not, in the least, need to hamper the processing overall speed. The speed of operation is determined by that treatment which requires the most time, which generally is the filling operation.

Further objects and advantages of method and device of the present invention will become apparent from the following detailed description if read in connection with the accompanying drawings.

In the drawings:

Fig. 1 is a side view of a framelike ampul carrier;

Fig. 2 is a plan view of the same carrier showing the shape of the three carrier bars;

Fig. 3 is a cross-section through the same carrier;

Fig. 4 is a diagrammatic drawing of the guide rail system of a set-up for the treatment of ampuls arranged in such framelike carriers as illustrated in Figs. 1 to 3;

Fig. 5 is a side view of a treating station for incising the spears of ampuls as located between D and E of the rail system shown in Fig. 4;

Fig. 6 is a plan view of a guide piece protecting the incising diamond and guiding the ampul spear to be presented to the diamond;

Fig. 7 is a front view of the guide piece shown in Fig. 6;

Fig. 8 is an elevational view of the treating stations located at F and M of the rail system shown in Fig. 4, representing the treating means at these stations;

Fig. 9 is a cross-section between P and Q of Fig. 4 and shows the arrangement of a station for marking ampuls;

Fig. 10 is a diagrammatic side view of a sterilizing chamber as used in connection with a set-up as indicated in Fig. 4;

Fig. 12 is an enlarged end view of a horizontally rotatable transfer and turn-over unit of the set-up shown in Fig. 11, representing arrangements for breaking off the tips of the ampuls and means of adjustment for various heights and diameters of ampuls;

Fig. 13 is a diagrammatic end view of a horizontally rotatable body with uniformly spaced rail sections serving as carriers for ampuls to be subjected to treatments at several stations passed in a circular path while the body is stepwise rotated;

Fig. 14 is a plan view showing a circular disk carrier with the spear of an ampul clamped at its center and guided between L-section or U-section rails; and Fig. 15 is a side view, partly in section, of the circular disk carrier shown in Fig. 14.

Figure 11:
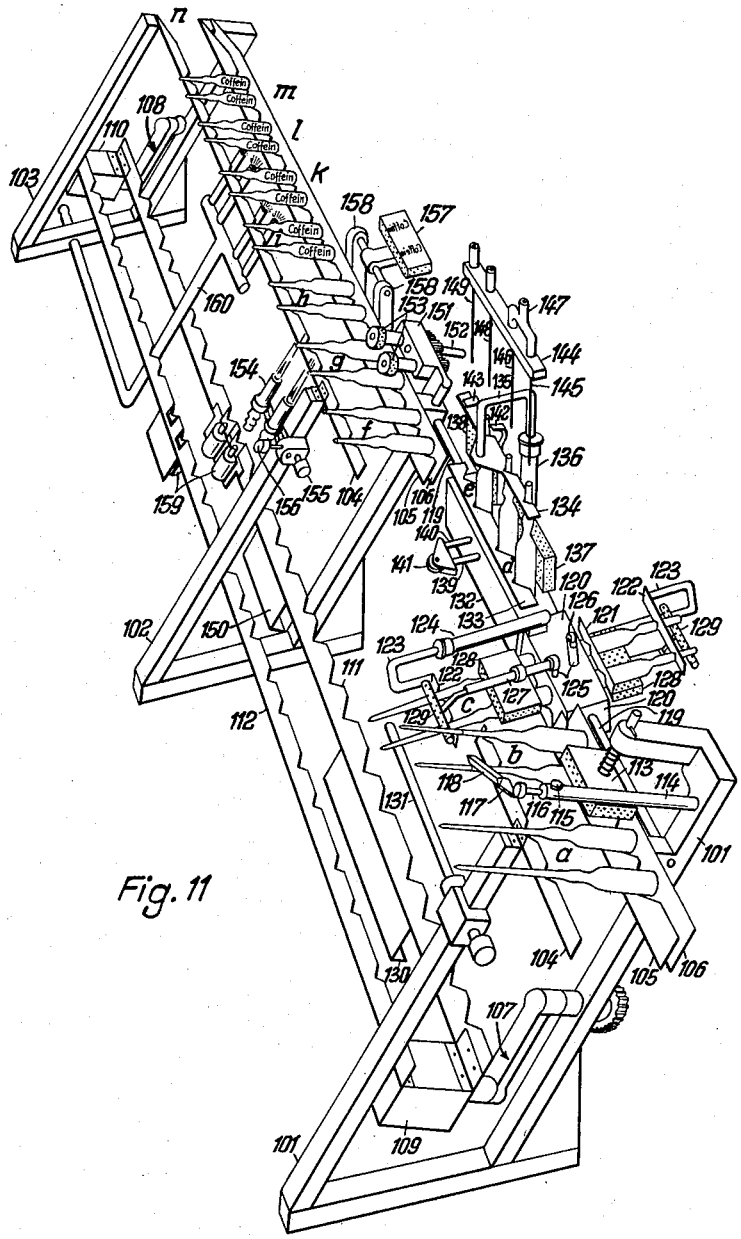
Fig. 11 is a diagrammatic perspective view of a complete set-up for the treatment of ampuls, operating with stationary ampul supporting rails and forwarding mechanisms.

In an embodiment of the set-up illustrated in Figs. 1 to 9, the frame-like carrier 1 (Figs. 1–3) comprises a longitudinal bar 2, serving as a support for the ampul bottoms; a thereto closely spaced parallel bar 3; a third longitudinal bar 4, forming the opposite side of the frame; and the frame end members 7. The longitudinal bar 3 is provided with ten notches 5 for reception of ampul bodies and the bar 4, with ten notches 6, for supporting the ampul spears in uniform adjustment. Both end members 7 are provided with a hole 8. A clamping bar 9, being of substantially the same length as frame 1 and carrying a cushioning 10 and resilient clamps 11, can be pushed over the frame, whereby little projections 12 of clamps 11 snap into holes 8 and hold the clamping bar 9 in place. The cushioning 10 thereby presses gently against the ampuls arranged in the frame, and prevents their displacement, thereby securing the spear adjustment.

The frame end members 7, moreover, are provided with T-shaped detents 13 enabling the frame 1 to be set on suitable guide rails 14 and to be moved thereon slidably.

Fig. 4 shows diagrammatically a plan view of an arrangement of guide rails for ampul carriers 1 of a set-up for treating ampuls. Such a set-up can be controlled and operated either automatically or semi-automatically. The latter manner of operation offers some advantages as will soon become apparent.

The guide rail system shown in Fig. 4 forms a closed track and comprises the rails a—a, b—b, c—c, and d—d, which are joined by the transfer units F, J, M, and S. The ampul carrier frames 1 travel along the rail system to all stations of the set-up. At the loading stations A, B, and C, uncut and empty ampuls are put by hand or by mechanical means on the carriers which at these stations are in a sloping position. In a manner still to be described, a number of operations are performed on the ampuls during their travel along the rail system. These operations may include treatments as follows: incising the spears between stations D and E, knocking off the spear tips at F; cleaning the inside of the ampuls at G, drying and, in case of necessity, sterilizing the empty ampuls at H, prefilling with an inert gas, if necessary, at K, final filling at L, sealing by fusion between N and O, marking between P and Q, drying or burning-in of the markings at R and S, and finally ejection of the ampuls at S. The points at which attendants must be placed for semi-automatic operation are designated in the diagram Fig. 4 as I to VIII.

Fig. 5 shows as a side view, by way of example, how an ampul carrier frame 1 is held and guided by engagement of detents 13 (Fig. 3) on a T-shaped guide rail 14 which in turn is mounted on suitable stands. It will be noted from Fig. 5, that the carrier frames are held at this point in a sloping position and assure a safe bedding for the ampuls lying thereon. Between D and E of Fig. 4, a friction wheel 15 with a somewhat resilient frictional covering is arranged above the conveying path of the ampuls. This wheel engages each ampul as it passes beneath it, thereby effecting rotation of the ampul about its axis in its notches 5 and 6 of the frame. A cutting diamond 16, resiliently mounted at a corresponding point below the ampul, cuttingly engages the spear of the rotating ampul and incises a line 17 all around the spear. The locking screws 18 and 19 serve for locking the diamond in position after it has been adjusted for proper cutting pressure and proper height of ampul.

To prevent lateral striking of the arriving spears by the diamond, a protective guide piece 20, as shown in Fig. 6 as a plan view and in Fig. 7 as front view, can be put on the diamond 16.

In Fig. 8 is shown a cross-section through the treating stations F and M of Fig. 4 representing also some of the devices arranged before and behind these stations. At position F, a switching unit is arranged by which carrier frames 1, arriving on rail a—a, are transferred onto rail b—b. This switching unit comprises a rotatable, three-armed structure in which each arm carries a rail section 14 having substantially the same length as the carrier frames. Indicated as a—a in Fig. 8, there is shown in the sloping position of rail a—a an ampul carrier frame coming from the incising station. At this point a clamping bar 9 with cushioning 10 (Fig. 1) is put on the carrier frame to secure the ampuls in the frame for the treatments now to follow. If the switching device is rotated in the direction of the arrow, the spear tips strike against a stationary bar 21 which has a cushioning covering and is suitably mounted on the stand. The spears are thereby smoothly broken off at the incised points. The break-off action takes place with a certain pull on the necks, which is achieved by not letting the striking action occur perpendicularly but somewhat inclined toward the ends of the spears. To get this result, the ampuls on the switching unit F are given a position between radial and tangential. A somewhat adhesive coating can be applied on bar 21 to enhance this pulling effect. On account of the downward pointing spears of the ampuls, no glass splinters will drop into the ampuls, and the thus opened ampuls pass at the end of this movement into a position designated in Fig. 8 as b—b, in which the ampul openings point downward, and thence onto rail b—b and in turn to treating station G (Fig. 4). The ampuls arrive thereabove a feed line 22 and groups of inlet tubes 23 connected thereto which can be raised to enter through the open spears into the ampuls being securely held in adjustment in the notches of their carrier frames 1. With the inlet tubes inserted in the spears, cleaning fluid or steam is injected into the ampuls, and the used fluid is collected and disposed through a gutter 24 provided therefor. After withdrawal of the inlet tubes 23 and passing the carrier frames to drying station H (Fig. 4), other inlet tubes 25 are inserted into the ampuls, which are similarly arranged as inlet tubes 23, but which feed air or hot air into the ampuls for the purpose of removing cleaning fluid and for drying. By using steam or hot air as cleaning or drying agent, sterilization can be effected simultaneously therewith.

The ampul carrier frame 1 passes now to station J (Fig. 4) and hereonto a transfer and switching unit which is rotatable about a horizontal axis 26, as indicated in Fig. 8. Rotation about this axis for 180 degrees brings the ampuls from the position taken on rail b—b into the position of rail c—c, as indicated on the right-hand side of Fig. 8, where the ampuls can be seen in straight upright position. At the subsequent treating stations K and L, there are arranged above the ampul group, groups of inlet tubes 27 or 28 for the purpose of injecting either, if necessary, a prefilling of inert gas or the final filling of the ampuls. The inlet tubes are lowered through the adjusted spears into the ampuls, and filling is accomplished in a generally known manner.

By means of switching device M, located at the subsequent treating station, the carrier frames 1 are swung from the position taken on rail c—c into the position of rail d—d, whereby the ampuls return into their initial sloping position in which they do not need the protection lent by clamping bar 9 with cushioning 10. Therefore, said bar is here removed and handed over to the oppositely located treating station F. At N (Fig. 4) the upper portions of the spears may be preheated, if necessary, or remnants of filling may be vaporized by steam. Between N and O is an arrangement which in certain respects resembles the devices for incision as shown in Fig. 5 and is employed for sealing the ampuls by fusion. This sealing device comprises a friction wheel 29 and a fusing burner 30 indicated in dotted lines at the right-hand side of Fig. 8. The flame of the burner impinges upon the spear opening while the ampul is rotated by the friction wheel. This action takes places while the carrier frame with adjusted ampuls moves slowly from point N to point O (Fig. 4). It will be understood that, instead of employing only one burner 30, there can be arranged ten such burners, and instead of using a friction wheel which actuates only one ampul at a time, friction means can be mounted which simultaneously set the whole group of ampuls in rotation.

On their way from P to Q (Fig. 4) the ampuls are marked by means of an arrangement shown in Fig. 9. A suitable stand 34 carries on its top by means of the guide rail 14 an ampul carrier frame 1 and somewhat lower a vertically slidable arm 35 upon which a carrier plate 33 is horizontally slidably mounted in a slide 36. The plate 33 carries ten pairs of resiliently mounted forks 31 and 32. These forks lift the ampuls somewhat off their beddings in frame 1 when plate 35 is raised, whereby care has been taken that the forks toward the spears do not push against the spears themselves but against the upper portions of the ampul bodies. The ampuls so raised come in contact with a printing or print-transferring plate 37 which previously has been inked by swinging outward into contact with an inking device not shown.

By sliding plate 33 upon plate 35 in crosswise direction relative to the ampuls, the latter are rolled along the printing plate 37 for a distance sufficient to transfer all of the marking. During this rolling action the carrier frame 1 has been advanced by means of tongue 38, mounted upon plate 33 and engaging frame 1, so that, when plate 35 is lowered, the marked ampuls return into their proper notches in frame 1.

If the marked portion of the ampul periphery is longer than the spacing between two adjacent ampuls in the frame, the carrier plate 33 must be provided with only five instead of ten pairs of lifting forks so that marking takes place in two groups of alternate ampuls in two successive operations.

For marking, which can be effected either during travel of the ampuls from P to Q or with the ampuls stationary at P or Q, all known methods and processes of printing or offset printing can be applied.

Beneath station R (Fig. 4) and perhaps beneath station S and other stations which may be added, there are arranged heat sources, such as, for instance, small burners or electric heating units, for the purpose of drying or burning-in the markings.

From station R the carrier frame 1, loaded with marked ampuls, advances to a sliding platform S, by which it can be returned from rail d—d to rail a—a. At this point the completed ampuls can be removed from the carrier frame 1 by hand, or mechanical ejection can be effected in such a way that the ampuls are lifted out of the carrier frame 1 over the bottom supporting bar 2 by means of a suitable corrugated plate, whereafter they may, for instance, slide off by their own weight through a suitable chute with a grooved bottom into a magazine or onto a conveyor or directly into a commercial packing. In the latter case, the grooves in the bottom of the chute preferably converge toward the outlet end so that the ampuls enter the package side by side.

Ejection of ampuls can be effected without special mechanical means during their movement along platform S. For this purpose, a corrugated plate (not shown) projecting from rail a—a in direction toward rail b—b, is arranged, which enables the ampuls, approaching this plate in their carrier frame, to be lifted out by said plate and be diverted into a chute.

The emptied carrier frames 1 travel from S on rail a—a to station A where they are fed with a new group of ampuls and begin their travel for the whole cycle of operations anew. The set-up illustrated in Fig. 4 requires fifteen carrier frames for full capacity operation.

To accommodate different sizes of ampuls, different sets of carrier frames can be provided or said frames can be made adjustable. To provide adjustment for different ampul heights, it is only necessary to make frame end members 7 (Fig. 1) of two telescoping portions; and to provide for different ampul diameters, bar 3 must be made laterally adjustable with respect to the frame. By arranging the telescoping frame end member portions, so that relative movement takes place in a direction somewhat inclined to the plane of the frame, it is possible to achieve that, by increasing the distance between bars 2 and 4, also the location of bar 3 is simultaneously changed to correspond to the larger diameter of higher ampuls and vice versa.

If conveyance of the carrier frames and actuation of the treating devices is not effected by power but by hand (an operation which offers some advantages in the application of the embodiment shown in Figs. 1 to 9, because it assures that each treatment, especially incising and sealing, can be performed under observation), there are required, for the set-up shown in Fig. 4, eight attendants at the points indicated as I to VIII, who have to actuate the treating devices besides charging and passing-on the carrier frames.

The manipulations to be performed require no special skill and the speed of operation can be adjusted to suit the capability of the attendants. By experience it has been found that it is best to let the attendant whose work requires the most time (by handling ampuls of large filling capacity this is generally the attendant at the filling station standing at point V) give a signal for the action of forwarding the carrier frames at all stations.

With a set-up as above described and in semi-automatic operation, it is possible to attain, with the same number of attendants, ten times the output reached by previous methods, because, in the present set-up, at each station ten ampuls are treated simultaneously. More important, however, is the fact that the present method assures considerable improvement in quality and outstanding reduction of rejects.

If it becomes necessary or desirable to subject the ampuls in the carrier frames 1 to a sterilizing process, this can, for instance, be effected by interposing, instead of platform S (Fig. 4), a sterilizing chamber, such as diagrammatically shown in Fig. 10 and designated by numeral 39. From rail d—d (Fig. 4) the carrier frames 1 with ampuls enter, after they have been secured by a wire clamp (similar to clamp bar 9, Figs. 1 to 3) against dropping out, through an inlet 40 into the sterilizing chamber 39 where they land upon an endless conveying device 42 which is provided with retainers for frames 1 and perhaps also with securing means for the ampuls, in which case the mentioned wire clamps are superfluous.

The ampuls, travelling in the direction of the arrow through the sterilizing chamber 39, traverse first the lower part of the chamber, whereby their spears are in a sloping downward position. Because of pressure increase due to increased temperature, even the smallest leakage of the fused sealing at the spears will show up by penetration of ampul content. Leaked out fluid accumulates in a receptacle at the bottom 43 of chamber 39 and is available for eventual further use.

After having travelled through the upper half of the sterilizing chamber 39, the ampuls are finally diverted to reach outlet 41 and return therethrough to rail a—a of the set-up Fig. 4. All ampuls which are detected as leaking are discarded at A or another additional station before A. Detection of leaking ampuls is easy on account of the fact that they are no longer entirely filled. Such ampuls are immediately replaced from a supply of perfect ampuls, and the sterilized and leakage-tested ampuls are then diverted onto a chute and to the packing station in a similar manner to that previously described. Should, however, another treatment, such as an inspection by optical means for the purpose of detecting foreign particles, be required, this can be effected on an additional rail portion. Such inspection is generally not necessary in a processing cycle as described.

Because a test for leakage-proof sealing as above described is more reliable than previously employed methods, such as immersion in coloured fluids, and avoids the disadvantage of subsequent drying and polishing as required in the said previous method, the described method is recommended even when sterilizing is not necessary or not permissible, in which case it suffices to subject the ampuls to a lower temperature than is necessary for sterilizing.

As sterilization requires no accurately adjusted bedding of the ampuls, this treatment can be effected without such provision and in a manner whereby the ampuls are taken in arranged order from the set-up (Fig. 4) and are transferred to a conveying device of simpler construction, such as, for instance, a wire screen or a perforated belting, serving to carry the ampuls, with spears steadily or temporarily pointing downward, through the sterilizing chamber.

The Fig. 11 shows a diagrammatic perspective view of a modified embodiment of this invention operating with stationary ampul supporting rails and forwarding rails for conveying the ampuls.

Upon a suitable sloping frame 101, 102, 103 there are arranged three rails 104, 105, 106, spaced in parallel, which serve as supports for ampuls in sloping position. The bottoms of the ampuls rest against rail 106, the ampul bodies are supported a few millimeters above the bottom in suitable notches of rail 105, and the spears are supported, in adjusted manner about five to ten millimeters below the point of prospective sealing, in notches of rail 104.

Pivotally mounted on frames 101 and 103 are crank arms 107 and 108 which, at their free swinging ends, carry connecting blocks 109 and 110, respectively, which serve as mounting for a pair of forwarding rails 111, 112 being more closely spaced than rails 104 and 105 and having similar notches. When the crank arms 107, 108 are turned in the direction of the arrows, the pair of rails 111, 112 describes a circular movement and, before reaching its uppermost position, enters between the stationary rails 104 and 105 and lifts with its notches the ampuls, lying in the notches of rails 104, 105, from these notches and carries them to the next or, as in the example shown in the figure, to the next but one notches in the pair of rails 104, 105 where they are laid down while the rails 111, 112 continue their downward movement. The rail 106 must be of such a height that the ampul bottoms, even in their highest position during their forwarding movement on the pair of rails 111, 112, never lose their support against rail 106. It will be understood that in this manner, for every revolution of the crank arms, all ampuls lying on rails 104, 105 are advanced in the direction toward the next treating station. In the embodiment shown, by way of example, in Fig. 11, every treating station is equipped for treating two ampuls simultaneously; it is, however, obvious that they may be equipped for treating more than two and also for only one ampul at a time.

The ampuls can be subjected to several treatments while bedded in the notches of the pair of rails 104 and 105 (or corresponding other rail portions), or during their forwarding movement while bedded in the notches of the pair of forwarding rails 111, 112. The uncut ampuls, fed by hand or by a mechanical contrivance onto the rails, are passed during their first forwarding movement, which is from *a* to *b*, against a pressure plate 113 resiliently held by a bracket connected with the frame 101. The plate 113 has a cushioned friction covering and the ampuls in passing are rotated thereby in their notches in the pair of rails 111, 112. The frame 101 carries furthermore, in parallel relation to the ampuls, a tubular bar 114 in which a bar 116 is slidably mounted and can be set by a screw 115. Bar 116 carries at its outer end a blade spring 117 to which a wedge shaped carborundum bar 118 or another glass-incising tool is fastened. By means of a set screw 115 adjustment of the incising tool can be effected in such a way that the ampuls, rotating beneath the pressure plate 113, are incised all around their spears at the desired height and at a tool pressure found to be suitable.

An ampul turn-over device is mounted at station *c* for the purpose of bringing the ampuls into a spear-downward or downward sloping position so that, when breaking off the spear tips, no splinters can enter the ampuls. A shaft 119, journalled in bearings on frames 101 and 102, carries a square carrier body 120 which normally assumes a position in which one of its side faces forms a continuation of rail 106. A rail portion 121 with two notches, mounted on carrier body 120 and arranged in spaced relation above thereof, forms a continuation of rail 105; and a further notched rail portion 122, mounted by means of a bow-shaped rod 123 and a bracket 124 on carrier body 120, forms a continuation of rail 104. The carrier body 120 with its rail portions 121, 122 thus forms, in its normal position, a direct continuation of the rail path 106, 105, 104. The opposite side of body 120 carries similar rail portions 121 and 122, and to effect turn-over of ampuls side for side it is only necessary to turn body 120 on its shaft 180 degrees.

For securing the ampuls in place during their turn-over, some fixtures are provided at two opposite sides of body 120; one set of which will be described. A rod 125 extends through body 120 and carries, at one side thereof, a roller 126 (or 126') and, at the other side, a tubular holding rod 127. Rod 125 is urged by a spring (not shown) in the direction of the roller. A pressure plate 128, for engaging the ampul bodies, is slidably mounted on rod 127 and can be secured in place by a set screw; furthermore, a pressure bar 129 for resiliently engaging the ampul spears can be set in a similar manner on rod 127 as plate 128 but independently therefrom. When engaging the ampuls, the pressure bar 129 comes in contact with the spears closely beneath the point of incision and serves as elastic counter support during breaking-off of the spear tips. Mounted beneath rail 111 is an L-section bar 130 which, during upward movement of the pair of forwarding rails 112, 111, pushes against roller 126 and raises thereby the rod 125 with fixtures 128, 129 off the ampuls, which have been clamped thereby, releasing them for transport. Immediately after laying down new ampuls at station *c*, the L-section bar 130 releases rod 125 with fixtures 128, 129 again, on account of the downward movement of the pair of forwarding rails 112, 111, and the new ampuls are clamped in position on body 120. On turning the turn-over unit on shaft 119 for half a turn, the spears of the ampuls strike against a bar 131, adjustably mounted on frame 101, whereby the tips break off at the point of incision and drop into a receptacle not indicated in the figure.

During the subsequent turn-over movement, the now open ampuls return to their position in alignment with their rail path and, during the next forwarding step, are passed on to station *d*, while at the same time new incised ampuls advance from *b* to *c*.

At the stations *d* and *e*, prefilling of the ampuls with inert gas or final filling is effected. These stations are combined and comprise a carrier member 132 pivoted on a shaft 119 for swinging movement from the normally sloping position to vertical position and vice versa. The upper surface of carrier member 132 forms, in the normal position of member 132, the continuation of rail 106 and carrier body 120; and the rails 133, 134 forms the continuation of rails 105, 104 and the rail portions 121, 122. The rail 134 is secured to member 132 by means of a bow-shaped rod 135 and a bracket 136.

Practically similar means as at *c* are applied for clamping the ampuls in place at the stations *d* and *e*. Rods 139, 140 are provided with a common roller 141 and carry pressure plates 137, 138, which are actuated by way of roller 141 and rods 139, 140, by the L-section bar 130 fixed on the bottom of rail 111.

On pressure plate 138, belonging to filling station *e*, are mounted resilient blades 142, 143 serving as feelers for the purpose now to be described. When advancing the pressure plate 138 against the ampul bodies, the feelers 142, 143 touch the ampul spears and are backwardly deflected as indicated at 142. If an ampul is missing in its place, the feeler covers the empty notch in the rail 134 as can be seen at 143.

A set of inlet tubes is mounted for upward and downward movement in holder 144 above the treating stations *d* and *e*. The inlet tubes 145, 146 at station *d* are joined to a common feed line through which carbonic acid, nitrogen, or another inert gas may be fed. The inlet tubes 148, 149 at station *e* are of different construction and are separately slidable in holder 144, and are connected, each separately, to a guide rod (not shown) and, each separately, to a metering device (pump or the like, not shown). When lowering the inlet tube holder 144, the inlet tubes enter the ampuls through their spears, which stand adjusted, that is, accurately centered, in the notches of the rail portions 134. After the inlet tubes have entered the ampuls, gas is blown into the ampuls at *d*. At *e* the injection of fluid is effected by means of the metering device which starts action in the lowermost position of the appertaining inlet tube guide rod which in this position engages, for example, an actuating lever of the metering pump drive. If for any reason an ampul is missing from its notch, the inlet tube cannot proceed to its lowermost position, because the feeler 143 has covered the empty notch as above described, and no injection is effected through such an inlet tube. This feature prevents spoilage of fluid and contamination of the machine.

After raising the inlet tubes to their uppermost position by inlet tube holder 144, carrier member 132 with all devices mounted thereon is swung into its normal sloping position, whereupon a further forwarding step takes place in a manner already described.

At *f* the stationary rail track continues with rails 104, 105, 106. Suitable burners (not shown) for preheating the ampul spears or steam-ejecting nozzles (not shown) for vaporizing the ampuls, can be arranged at *f*, if necessary.

The sealing station is located at *g*. Here a vertically slidable carrier member 151 downwardly urged by spring tension is mounted on frame 102. Said carrier member is held in raised position during the ampul transfer step by an L-section bar 150 also mounted at the bottom of rail 111. Carrier member 151 carries two resiliently covered rollers 153 which are driven by a common shaft 152 and are adapted to rotate the ampuls, lying adjusted on the rails at *g*. Flames issuing from burners 154 impinge during rotation of the ampuls upon their open spear ends to effect sealing. The burners 154 are mounted on frame 102 and can be set for proper height by screw 155 and for proper inclination by screw 156.

Thereafter the ampuls are marked, two at a time, while traversing the station *h*, by rolling in a somewhat similar manner as at station *a*, against a printing plate 157 pivotally mounted in bearings 158. When swung backward (position shown in Fig. 11) the printing plate 157 receives ink of one or several colours from a colouring or inking device not shown. The printing plate 157 is adjusted for operation at such a height above the ampuls that each one of the two ampuls touches plate 157 only for such a short distance of travel as is necessary to transfer the whole text of the marking, i. e., neither of the two ampuls rolls along the whole length of plate 157, but only along a portion carrying the printing intended for it. Because differences in diameter of the ampuls would disturb such marking operation, yielding mountings 159 are provided for the notches on the pair of rails 111, 112 in this range. Suitable burners 160, issuing flames directed against the fresh ink on the ampuls, effect quick drying or burning-in of the markings at stations k and l.

After having passed still another station m, the completed ampules arrive, after their final forwarding movement, at n, where they are laid upon the sloping ends of rails 104, 105, 106, from where they slide into a receptacle or onto means for further handling.

It is without difficulty possible to arrange further treating stations along the rails, as, for example, for cleaning the ampuls or for optical tests to detect contamination of the filling. An optical test can be readily made owing to the fact that the ampuls are visible and freely accessible when lying on the rail track. Another treating station can also be interposed, at which an internal strain is set up in the necks of the ampuls by heating the necks in a well known manner and chilling a zone around their necks by a chill ring or roller. This procedure will set up strains which facilitate opening of the ampuls at the time of use. The present conveying method by means of notched rails can also be applied for a continuous passing of the ampuls through a sterilizing device, such as, for instance, a sterilizing chamber. For such additional treatments the conveying structure can be extended or, still better, another conveying system of the same kind with stations more closely spaced can be joined to the original structure, whereby the forwarding rails of said additional system work alternately with the pair of rails 111, 112 and take over the last ampuls deposited at the end of the rail path 104, 105, 106. On the other hand, it is also possible to join the set-up to an ampul manufacturing machine which produces ampuls from glass tubing, with the result of obtaining a continuous manufacturing process from glass tubing to filled and marked ampuls without intermediate transporting and storing.

An automatic mechanical set-up according to this invention is especially suitable for processing various sizes of ampuls, because essentially, only adjustment of the stationary and the forwarding rails and of the clamping fixtures becomes necessary for a change over. The turnover unit requires therefor special adjustments. This unit is shown as an enlarged end view in Fig. 12, representing also an end view of the forwarding rails. In the illustration shown, the crank arms 107 and 108, with their pair of forwarding rails 111, 112, have reached the uppermost position; have raised the ampuls, during the instantly occurring forwarding step, to a maximum height above the stationary rails 104, 105 and 121; and have released the ampul holding fixture 128, 129 by pressing with L-section bar 130, fixed to the bottom of rail 111, against roller 126 on rod 125.

Each one of the two crank arms 107, 108 carries at its outer end a block 109 and 110, respectively, onto which the forwarding rails 111, 112 are mounted by means of interposed toothed racks 161, 162. By means of the toothed rack 161, the rail 111 is made adjustable for various ampul diameters; and by means of toothed rack 162, the forwarding rail 112 is made adjustable for various heights of the ampuls. Adjustment can be effected through pinions 163, 164 which, for the purpose of uniform adjustment throughout the whole length of the rails 111, 112, are interlocked by shafts 165, 166 which extend from block 109 to block 110. The adjusting screw, actuating shaft 165, is located at block 110; and the adjusting screw 167 for shaft 166, at block 109.

Adjusting of the rail portion 121 for various ampul diameters is effected by shifting, on the carrier body 120 itself. Adjusting of the rail 122 for various ampul heights is effected by shifting bow-shaped holder 123 in tubular holder 124 and setting of the clamp nut 168.

The pressure plates 128, with their brackets 169 on tubular rod 127, can be shifted longitudinally relative to brackets 169 by means of pins 170 extending therethrough and are set in a desired position by means of screws 171. The pressure bars 129 with carrier arms 172 are slidably mounted on rods 127 and can be set by means of screws 173.

Fig. 13 shows a pentagonal rotary body 180 mounted on a horizontal shaft 181. Every side of this body is equipped with fixtures somewhat resembling the fixtures on carrier body 120, shown in detail in Fig. 12. As can be noted in Fig. 13, the pentagonal body carries rail portions 121 and 122, mounted thereon by means of bow-shaped holders 123, and pressure plates 128, mounted by slidable carrier rods 127.

Charging and discharging of the pentagonal body 180 takes place in sloping position of the ampuls at point U by means of the pair of forwarding rails 111, 112, in a manner as described in connection with carrier body 120, during a period in which the pressure plate 128 is in raised position. The ampuls are clamped in place by pressure plate 128 in all other positions and during all ampul treating operations effected, with the ampuls on body 180.

In the operative positions V, W, X, Y of the pentagonal body, suitable inlet tubes are movably mounted oppositely to the adjusted spears of ampuls, and can be inserted into the ampuls during stand-still periods of the body.

The previously incised ampuls arriving at U strike with their tips against the fixed rod 131 and break off the tips during rotational movement of body 180 from U to V. The open ampuls are cleaned at V by injection of a cleaning fluid or steam through the inserted inlet tubes 182, and are dried at W by injection of hot air or the like through inlet tubes 183. At X drying can be continued through inlet tube 184 or an inert gas can here be injected. The ampuls are finally filled at Y through inlet tubes 185. During the following step the ampuls return to U and are then passed on by the pair of forwarding rails 111, 112 to the sealing station and so forth.

The rotary body 180, just described, can be arranged to replace the stations c, d, e of the set-up shown in Fig. 11. It not only can replace these stations, but allows additionally the treatment of cleaning, drying and, if required, sterilizing of ampuls not provided for in any known device of this kind.

Instead of using rail portions for directly supporting ampuls, it is possible to provide a rotary body 180 with guide rail portions, as, for example, rail portions 14 for ampul carriers 1 (Figs. 1–9) or pairs of guide rail portions 194 or 195 for circular ampul carriers 190 (Figs. 14–15), hereinafter described, whereby charge and discharge of the carriers is also effected at U, either by hand or by mechanical means.

If such a rotary body 180 is equipped for treatment of ampuls in carriers, it can replace, for example, all stations from E to M in the set-up diagrammatically represented in Fig. 4 and described in connection with Figs. 1 to 9.

For additionally necessary treatments, the rotary body 180 can be arranged for accommodation of any larger number of treating means.

Intermittent stepwise movement of rotary body 180 can, for example, be effected by a five-division Geneva stop drive, mounted on one end surface of the body; and the simultaneous actuation of the pressure plate 128 can, for example, be effected by a cam way mounted on shaft 181 which in this instance is stationary.

Insertion and withdrawal of the groups of inlet tubes 182 to 185 can be controlled by a correlated control system of general design.

Fig. 14 is a plan view and Fig. 15 is a side view, partly in section, of a circular or annular carrier body or disk 190, in which the ampul is clamped at its spear in coaxial relation to the circular carrier and is held in this position by this clamping only. For this purpose the carrier body is provided with an aperture 191 having a V-shaped or semi-circular notch 192, substantially at the center of the circular body, for receiving the ampul spear and for holding the same accurately adjusted at the center of the body. Clamping is effected by resilient means disposed in aperture 191, and representing, in the present example, a curved blade spring 193 which presses resiliently against the ampul spear. The notch 192 and the spring 193 are preferably shaped in conformity to the tapering contour of the ampul spear, and flaring out a little at the entering side to facilitate insertion of the spears.

In application, the circular carrier bodies 190 may be passed on tracks, such as, for example, on L-section rails 194 or U-section rails 195, from treating station to treating station. If using a pair of U-section rails 195, certain portions of the conveying track can be sloped or set vertically, and the carrier bodies 190 and the ampuls secured therein can assume any position, with the result that an ampul, adjusted and well centered at the middle of a carrier, is presented at each treating station in accurate operative relation to the treating means there located. It is readily possible to rotate an ampul, clamped securely at the center of a circular carrier body, about its axis by rotating the carrier body; and this is done with the spear of the ampul pointing downward for incision, and in an upright position for sealing.

Furthermore, it is advisable to enter the ampuls only slightly into the center notches of the carrier bodies 190 by hand and provide setting means along the feed portion of the rail track, such as, for instance, an adjusting bar for the ampul bottoms or a mechanically actuated pusher arrangement; the former for adjusting and setting the ampuls in their carriers during passing, and the latter for adjusting and setting during stand-still, both means, however, serving to assure accurate alignment of all ampuls on the track for the purpose of effecting incision of the spears at equal heights.

To provide for application of the same carrier bodies 190 for ampuls of various sizes and with various spear diameters, it is advisable to make the notch or stop 192 at the center radially adjustable; and it is important to assure that this adjustment is always properly made so that the ampuls are clamped concentrically and coaxially with respect to the circular body.

A set-up for processing ampuls by application of the circular carrier bodies 190 would, for example, comprise two parallel rail tracks, each track consisting of two L-section rails 194 or two U-section rails 195, which tracks are joined at both ends by transfer and turn-over units of U-section rails 195, allowing for turn-over of the ampuls by 180 degrees. The ampuls are fed onto one track with their spears downward and are incised at the next treating station, while the circular carrier bodies 190 with the ampuls therein are rotated, whereupon the spear tips are broken off. Then the ampuls are cleaned at the next station in upside-down position by injection of cleaning and drying agents. The turn-over unit at the other end of the tracks turns the ampuls over and passes them in upright position onto the other track. Here they are prefilled, filled, and then sealed by fusion while rotating about their axes with their carrier bodies. The ampuls are then pushed out of their carrier bodies by a suitable pusher descending on them from the top. The now empty carriers are passed by way of the other turn-over and transfer unit to their starting point on the first track.

It is also possible to combine a number of circular carrier bodies 190 to a group on one carrier, which then traverses a set-up as just described in a similar manner as described in connection with the ampul carrier frames 1.

The path of travel of such a carrier of a group of carrier bodies 190 may be along a guide rail system similar to that indicated in Fig. 4, or along a circular path in connection with a rotary body having a horizontal axis, as shown in Fig. 13.

Ampuls with small spear diameters, usually requiring no rotation about their axes during incision and sealing operation, are preferably secured in groups in stick-like carriers with suitable clamping means for their spears, and such clamped groups are passed from treating station to treating station. Incision of the spears in this case is effected by passing the carrier with the group of ampuls, spear downward, along an incision tool. Similarly, for sealing, the group is passed, spear upward, between fusing flames, whereby preferably the flames impinge from two opposite sides upon the spear openings. In this case both above operations are performed without imparting rotation to the ampuls.

The described preferred embodiments of the present invention and the disclosed methods of practicing this invention are given by way of example, and it is to be understood that modifications and adaptations to certain kinds of ampuls or other containers of this class, or other combinations of treatments are possible to suit prevailing circumstances.

What I claim is:

1. Method for processing ampuls and the like of the character described, which substantially comprises uniformly supporting said ampuls, during the various treatments at and through their spears, at at least two spaced points along the length of said ampuls, one of said spaced supporting points being situated above the bulge at said ampul spear below the point of prospective sealing, the other of said spaced supporting points being situated at any point along the length of said ampul below said first supporting point, thereby keeping said ampul spears uniformly oriented for accurate operative relation in respect to the treating means for said treatments.

2. Method for processing ampuls and the like of the character described, which substantially comprises subjecting said ampuls successively to the various treatments at and through their spears while keeping the latter in a position always in uniformly oriented and adjusted, said position being obtained by uniformly supporting said ampuls, during said treatments, at spaced points along the length of said ampuls, one of said spaced supporting points being situated above the bulge at said ampul spear below the point of prospective sealing, the other of said spaced supporting points being situated at any point along the length of said ampuls below said first supporting point, thereby warranting immediate and accurate operative relation of said ampul spears to the treating means to be confronted by said ampuls for said treatments.

3. Method for processing ampuls and the like of the character described, which substantially comprises uniformly supporting said ampuls, during the various treatments at and through their spears, at two spaced points along the length of said ampuls, one near the bottom of their main body, and the other above the bulge at said ampul spear below the point of prospective sealing, thereby keeping said ampul spears uniformly oriented in adjusted position and warranting their accurate operative relation to the treating means for said treatments.

4. Method for processing ampuls and in the like of the character described, wherein the ampuls are successively subjected to the various treatments at and through their spears, while resting on an abutment for their bottoms and on unilaterally open supporting means uniformly contacting said ampuls near the bottom of the main body and above the bulge at said ampul spear below the point of prospective sealing, thereby keeping said ampul spears always uniformly oriented in a position warranting their immediate and accurate operative relation to the respective treating means for said treatments; said ampuls being secured to said supporting means in recumbent position by their own weight, in other positions by clamping means contacting the main body of said ampuls and forcing said ampuls against said open supporting means.

5. Method for processing ampuls and the like of the character described, wherein the ampuls are successively subjected to the various treatments at and through their spears with their spears kept always uniformly oriented in adjusted position by clamping each ampul spear at a distance between two spaced points along its length, both being situated above the bulge and below the point of prospective sealing, thereby warranting immediate and accurate operative relation of said ampul spears to the respective treating means for said treatments.

6. Method for processing ampuls and the like of the character described, which substantially comprises conveying said ampuls successively to the various treating means at successive treating stations arranged along the path for conveying ampuls, keeping the spears of said ampuls uniformly oriented in adjusted position by supporting said ampuls at said treating stations by a plurality of equal ampul supporting means uniformly supporting said ampuls at spaced points along their length, one of said spaced supporting points being situated above the bulge at said spear below the point of prospective sealing, the other of said spaced supporting points being situated at any point along the length of said ampul below said first supporting point, thereby warranting immediate and accurate operative relation of said ampul spears to the respective treating means at said treating stations, and subjecting said ampuls at said treating stations to the respective treatments at and through said uniformly oriented ampul spears in a continuous correlated cycle of operation.

7. A method as in claim 6, which further comprises transferring said ampul supporting means together with said ampuls at certain stations into operative positions convenient to the respective treatments, thereby positively effecting a position of accurate operative relation of said uniformly oriented ampul spears to the respective treatment means.

8. A method as in claim 6, which includes arranging treating stations with a sequence of different operative positions in spaced relation to one another around a circular path with substantially horizontal axis, and moving said ampul supporting means with said ampuls around said circular path successively to said treating stations, thereby attaining different angles of inclination and presenting said uniformly oriented ampul spears in successively varying operative positions to the respective treating means.

9. A method as in claim 6, which further comprises imparting rotary motion to said ampuls, at certain stations, while maintaining said uniform orientation of their spears, thereby warranting rotation, free from slinging, about the axes of said ampul spears.

10. Method for processing ampuls and the like of the character described, which substantially comprises arranging the ampuls on mobile ampul supports, adapted to keep the spears of said ampuls uniformly oriented by supporting said ampuls at spaced points along their length, one of said spaced supporting points being situated above the bulge at said spear below the point of prospective sealing, the other of said spaced supporting points being situated at any point along the length of said ampul below said first supporting point, conveying said mobile ampul supports together with said ampuls to the various treating means at successive treating stations arranged along the path for conveying ampuls; and subjecting said ampuls at said treating stations to the respective treatments at and through said uniformly oriented ampul spears, in a continuous correlated cycle of operation.

11. Method for processing ampuls and the like of the character described, which substantially comprises placing the ampuls at the charging station on an ampul supporting and conveying track substantially consisting of a plurality of equal ampul supports, adapted to keep the spears of said ampuls uniformly oriented by supporting said ampuls at spaced points along their length, one of said spaced supporting points being situated above the bulge at said spear below the point of prospective sealing, the other of said spaced supporting points being situated at any point along the length of said ampul below said first supporting point; conveying said ampuls successively to the various treating means at successive stations, arranged along said ampul supporting and conveying track, by taking them, after each treatment at each of said treating stations, from said supports and forwarding them to equal supports of the next station, thereby procuring anew said uniform orientation of said ampul spears; and subjecting said ampuls at said treating stations to the respective treatments at and through said uniformly oriented ampul spears, in a continuous correlated cycle of operation.

12. Method for processing ampuls and the like of the character described, which comprises clamping the spear of each ampul by clamping means attached to mobile ampul supports, aligning said ampuls to equal height within said clamping means, so that each spear is contacted by said clamping means at a distance between two spaced points along its length, both being situated above the bulge and below the point of prospective sealing, thereby keeping said ampul spears uniformly oriented; conveying said mobile ampul supports with said clamped ampuls to the various treating means at successive stations arranged along the path for conveying ampuls; transferring said mobile ampul supports with said clamped ampuls at those treating stations requiring a different operative position of said ampuls, into the actually needed operative positions; and subjecting said ampuls to the respective treatments at and through said uniformly oriented spears, in a continuous correlated cycle of operation.

13. A method as in claim 12, wherein mobile and rotary ampul supports are employed, and each spear of said ampuls is clamped coaxially to said mobile and rotary ampul supports by clamping means arranged at the center of said mobile and rotary ampul supports.

14. Method for processing ampuls and the like of the character described, which substantially comprises placing the ampuls in recumbent position upon mobile ampul supports contacting said ampuls at their bottom and at spaced points along their length, one near the bottom of the main body and the other above the bulge at the spear below the point of prospective sealing, thereby keeping said ampul spears always uniformly oriented; conveying said mobile ampul supports, with said ampuls lying thereon, successively to the various treating means at successive treating stations arranged along the path for conveying ampuls; and subjecting said ampuls at said treating stations to the respective treatments at and through said uniformly oriented ampul spears, in a continuous correlated cycle of operation.

15. A method as in claim 14, which includes temporarily securing said ampuls lying on said mobile ampul supports to said supports, and transferring said mobile ampul supports, with said ampuls secured thereto, at certain treating stations into operative positions required by the respective treatments at these stations.

16. Method for processing ampuls and the like of the character described, which substantially comprises placing the ampuls in recumbent position at the charging station on an ampul supporting and conveying track substantially consisting of an abutment for the bottoms of said ampuls and of a plurality of equal ampul supports contacting said ampuls at spaced points along their length, one of said points being near the bottom of the main body of the ampul and the other being above the bulge at the spear below the point of prospective sealing, thereby keeping said ampul spears uniformly oriented; conveying said ampuls in said recumbent position successively to the various treating means at successive treating stations, arranged along said ampul supporting and conveying track, by lifting them, after each treatment at each of said treating stations, from said supports, forwarding them to the next treating station, and laying them down upon equal supports at that station, thereby each time procuring anew said uniform orientation of said ampul spears; and subjecting said ampuls at said treating stations to the respective treatments at and through said uniformly oriented ampul spears, in a continuous correlated cycle of operation.

17. A method as in claim 16, which includes temporarily securing said ampuls lying on mobile portions of said ampul supporting and conveying track to the supports of said mobile track portions, and transferring said mobile portions with said ampuls secured thereto into operative positions required by the respective treatments at these stations.

18. In a device for processing ampuls and the like of the character described, the combination of treating means, and ampul supporting means uniformly supporting said ampuls at spaced points along their length, one of said spaced supporting points being situated above the bulge at the spear below the point of prospective sealing, the other of said spaced supporting points being situated at any point along the length of said ampul below said first supporting point, thereby keeping said ampul spears uniformly oriented in adjusted position.

19. In a device for processing ampuls and the like of the character described, the combination of a number of successively arranged treating stations, separate treating means at each of said treating stations, and ampul supporting and conveying means uniformly supporting said ampuls at spaced points along their length, one of said spaced supporting points being situated above the bulge, at the spear, below the point of prospective sealing, the other of said spaced supporting points being situated at any point along the length of said ampul below said first supporting point, said ampul supporting and conveying means being adapted to support and to convey said ampuls successively to said treating stations and to keep said ampul spears uniformly oriented in adjusted position.

20. In a device as in claim 19, said ampul supporting and conveying means substantially comprising unilaterally open, V-shaped supports for receiving ampuls in recumbent position and contacting said ampuls at spaced points along their length near the bottom of the main body and above the bulge at the spear below the point of prospective sealing, and an abutment for the bottoms of said ampuls.

21. In a device as in claim 19, said treating means being arranged in different operative positions convenient to the respective treatments, and means being provided for transferring said ampuls with said uniformly oriented ampul spears into operative positions actually needed by the respective treating means.

22. In a device as in claim 19, means for temporarily securing said ampuls to their supports during transfer into other positions.

23. The combination as in claim 19, which further comprises means for imparting rotary motion to said ampuls while maintaining said uniform orientation of said spears, said means being provided at treating stations requiring ampul rotation during the respective treatments.

24. In a device for processing ampuls and the like of the character described, the combination of a number of successively arranged treating stations, separate treating means at each of said treating stations, mobile ampul supports uniformly supporting said ampuls at spaced points along their length, one of said spaced supporting points being situated above the bulge at the spear below the point of prospective sealing, the other of said spaced supporting points being situated at any point along the length of said ampul below said first supporting point, thereby keeping said ampul spears uniformly oriented in adjusted position, and means for conveying said mobile ampul supports together with said uniformly oriented ampul spears successively to said treating stations.

25. In a device for processing ampuls and the like of the character described, the combination of a number of successively arranged treating stations, separate treating means at each of said treating stations, ampul supporting means having individual clamping means for the spears of said ampuls, means for aligning said clamped ampuls to uniform height within said clamping means, means for conveying said ampul supporting means together with said clamped and aligned ampuls successively to all said treating stations, and means for transferring said ampul supporting means with said clamped and aligned ampuls into operative positions actually needed by the treating means at certain treating stations; said ampul supporting means with said individual clamping means being adapted to support said ampuls by clamping their spears at a distance between two spaced points along their length above the bulge and below the point of prospective sealing, thereby keeping said ampul spears uniformly oriented in adjusted position.

26. In a setup for processing ampuls and the like of the character described, the combination of a guide rail system, a number of successively arranged treating stations thereon, separate treating means at each of said treating stations and in operative positions convenient to respective treatments, circular disk carriers movable on and rotatable with respect to said guide rail system, clamping means at the center of each of said circular disk carriers for coaxially clamping the spears of said ampuls, means for aligning said clamped ampuls to uniform height within said disk carriers; said guide rail system being adapted to guide said circular disk carriers from one station to another station, movable rail portions being interposed at certain stations adapted to be moved in perpendicular direction to the rails of the system to bring said disk carriers with their ampuls into actually needed operative position; said circular disk carriers being adapted to support said ampuls by clamping their spears at a distance between two spaced points along their length above the bulge and below the point of prospective sealing, thereby keeping said ampul spears uniformly oriented in adjusted position.

27. In a device for processing ampuls and the like of the character described, the combination of an ampul supporting rail track adapted to support, in spaced relation to one another and in recumbent position, a plurality of ampuls at spaced points along their length and to keep thereby the spears of said ampuls uniformly oriented in adjusted position, said ampul supporting rail track substantially consisting of three supporting rails spaced in parallel, one of said rails having notches for receiving the bodies of said ampuls near their bottom, another of said rails having notches for receiving said ampul spears and contacting them below the point of prospective sealing, and the third of said rails, without notches, being rest and guiding means for the bottoms of said ampuls; several treating stations along said ampul supporting rail track; treating means at every treating station of a number corresponding to the number of ampuls to be treated simultaneously at every treating station; forwarding means movably engaging said supporting rails and adapted to lift all ampuls, lying on said supporting rail track, from said notches, to forward them, in said recumbent position, to the respective next treating stations, and to lay them down into similar notches of the respective treating stations.

28. A method for processing ampuls and the like of the character described, which comprises providing at successive stations necessary treating means for some or all of the following treating steps determined by kind of ampuls and requirements of medical or industrial use, arranging ampuls by providing an original adjustment of their spears, which assures accurate operative relation to all said treating means at said successive stations in any needed operative position, maintaining said original adjustment during all treatments, continually effecting the required of the following steps: conveying the ampuls to a spear-incising station, effecting incisions at the spears of said ampuls by resiliently mounted incision means while imparting relative motion to them, breaking off the tips at said incisions by striking a stop preferably in a somewhat inclined direction toward the tip end and preferably while in spear-downward position, conveying said ampuls to a cleansing station, inserting inlet tubes through the adjusted spears into said ampuls preferably in spear-downward position, injecting cleansing and drying agents, thereby simultaneously effecting sterilization when using steam and hot air as cleansing and drying agents, conveying said ampuls to a filling station and into substantially upward filling position, inserting inlet tubes through the adjusted spears into said ampuls, injecting a metered quantity of medium into said ampuls, conveying said ampuls to a sealing station and into suitable upright to upright-sloping operative position according to convenience of the manner of spear adjustment, sealing the open spears by fusing whereby preferably rotation is imparted to said ampuls, discharging said ampuls, and continually arranging new ampuls by providing said original adjustment of their spears so that treatment takes place at all stations simultaneously.

29. A method as in claim 28, which further comprises arranging at one of said successive stations and at a therefore suitable place means for marking said ampuls and preferably means for drying or burning-in said markings, conveying said ampuls to a marking station, bringing said ampuls in rolling-off contact to printing means, resiliently pressing the ampul bodies against said printing means and imparting sufficient rolling-off motion to transfer the whole marking onto said ampuls, and preferably conveying said ampuls through a heated zone for drying or burning-in said markings.

30. A method as in claim 28, which further comprises arranging means for sterilizing the filled and sealed ampuls, conveying said ampuls through said sterilizing means for a period and at a temperature suitable to the ampul contents.

31. A method as in claim 28, which further comprises conveying the filled and sealed ampuls in spear-downward position through a heated zone of a temperature permissible to the ampul contents and for at least a time sufficient to set an inner pressure which effects expulsion of parts of contents of not tightly sealed ampuls, and discarding all not properly filled ampuls after their passing through said heated zone.

32. A method as in claim 28, which further comprises arranging at a suitable located station treating means that may become necessary to meet all requirements for readying said ampuls in special cases.

33. In a set-up of the character described the combination of a guide rail system having a number of successively arranged treating stations thereon, suitable treating means at every station, a plurality of ampul carriers adapted to carry groups of ampuls rotatable about their axes in sloping position and substantially consisting of three parallel spaced and framelike connected bars, one of said bars having notches for receiving the bottom portions of ampul bodies, another of said bars having notches for supporting and adjusting ampul spears somewhat below their future sealing points, and the third of said bars without notches serving as rest for ampul bottoms, and means for securing said ampuls in adjusted position on said ampul carriers in others than sloping positions, said guide rail system adapted for guiding said ampul carriers to said successively arranged treating stations and into needed operative position so that said ampuls with their adjusted spears come in accurate operative relation to said treating means at every station, said guide rail system substantially consisting of stationary rail tracks for holding and guiding said ampul carriers in sloping position, stationary rail tracks for holding and guiding said ampul carriers in needed other positions, and movably arranged rail track portions for transferring said ampul carriers into needed position or to another one of said stationary rail tracks.

34. In a set-up of the character described the combination of an ampul supporting rail track adapted to carry a plurality of ampuls rotatable about their axes in sloping position and substantially consisting of three parallel spaced rails, one of said rails having notches for receiving the bottom portions of ampul bodies, another of said rails having notches for receiving supporting and adjusting ampul spears somewhat below their future sealing points, and the third of said rails without notches serving as rest and guiding means for ampul bottoms, certain portions of said ampul supporting rail track being movably arranged and adapted to transfer the ampul group lying thereon into needed operative position; means for securing said ampuls in adjusted position on said movably arranged rail track portions in others than sloping positions; forwarding means movably engaging said supporting rails and adapted to lift all ampuls lying in said notches on said ampul supporting rail track, to forward them in their sloping position for a number of notches corresponding to the number of simultaneously treated ampuls, and to deposit them there into similar notches of said ampul supporting rail track, said forwarding means preferably having similar notches as said ampul supporting rails; actuating means for said forwarding means, and actuating means for effecting movement of said movable ampul supporting rail track portions alternately to the forwarding movement of said forwarding means; several treating stations arranged along said ampul supporting rail track, treating means at every station of a number corresponding to the number of notches all of said ampuls lying on said supporting rail track are forwarded by every forwarding movement so that to every one of said treating means at every one of said stations a new ampul is presented in accurate operative relation.

35. In a set-up for processing ampuls and the like of the character described the combination of a track for stepwise conveying ampul groups, a rotary body interposed in said track, being rotatable about a horizontal axis and having a plurality of indexing positions, track portions arranged in equal spacing at said indexing positions on the face of said rotary body and adapted to receive and to hold said ampul groups, uniform spear supports at said track portions, supporting the spears of said ampul groups in uniform adjustment somewhat below their future sealing points, sets of treating means arranged opposite and in operative relation to said uniformly supported and adjusted spears of said ampul groups in the various indexing positions of said rotary body, means for indexing said rotary body alternately to the forwarding movements on said conveying track; said track portions of said rotary body in one of the indexing positions forming a part of said conveying track and serving for conveying said ampul groups to and from said rotary body, and in the other indexing positions presenting said uniformly supported ampul groups with their thus always uniformly adjusted spears successively in varying operative positions but immediately in accurate and uniform operative relation to respective sets of said treating means as soon as a new indexing position is reached.

References Cited in the file of this patent

UNITED STATES PATENTS

| | | |
|---|---|---|
| 1,767,902 | Sickel | June 24, 1930 |
| 1,918,118 | Marzocchi | July 11, 1933 |
| 1,925,502 | Schaeffer | Sept. 5, 1933 |
| 2,378,989 | Edels | June 26, 1945 |
| 2,461,233 | Putnam et al. | Feb. 8, 1949 |
| 2,494,674 | Smith et al. | Jan. 17, 1950 |
| 2,530,230 | Cozzoli | Nov. 14, 1950 |
| 2,553,136 | Eisler | May 15, 1951 |
| 2,639,554 | Zons | May 26, 1953 |

FOREIGN PATENTS

| | | |
|---|---|---|
| 113,892 | Switzerland | Feb. 16, 1926 |
| 550,528 | Germany | May 19, 1932 |
| 612,720 | Germany | May 3, 1935 |